No. 686,686. Patented Nov. 12, 1901.
H. J. BELL.
ENGINE.
(Application filed Feb. 9, 1900.)
(No Model.) 4 Sheets—Sheet 2.
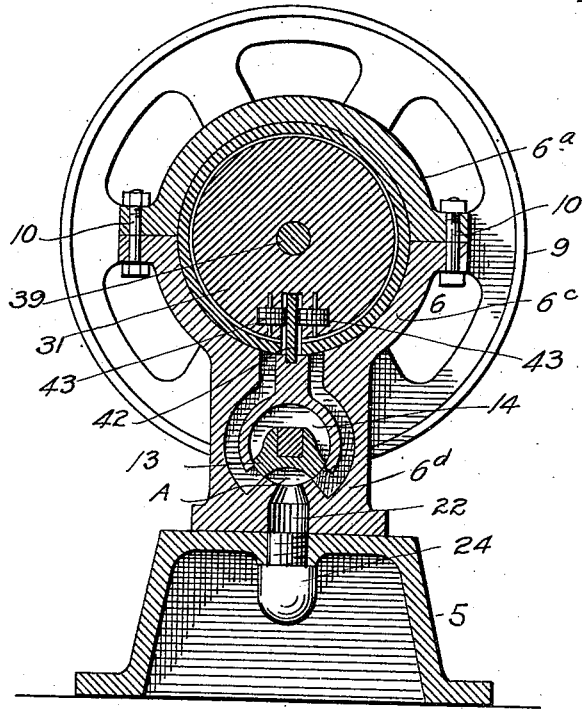
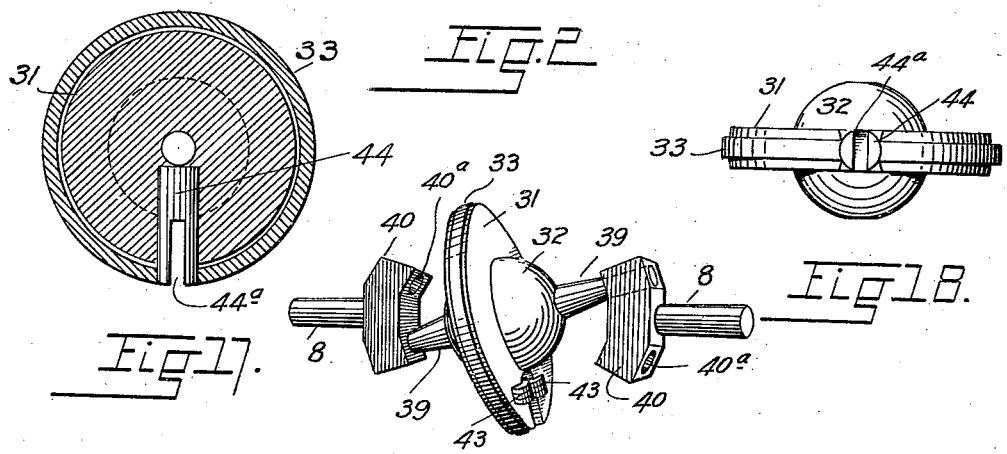
WITNESSES: Grace Mytinger
J. H. Bockenfeld
INVENTOR.
Harold J. Bell.
BY
ATTORNEY.
THE NORRIS PETERS CO., PHOTO-LITHO., WASHINGTON, D. C.

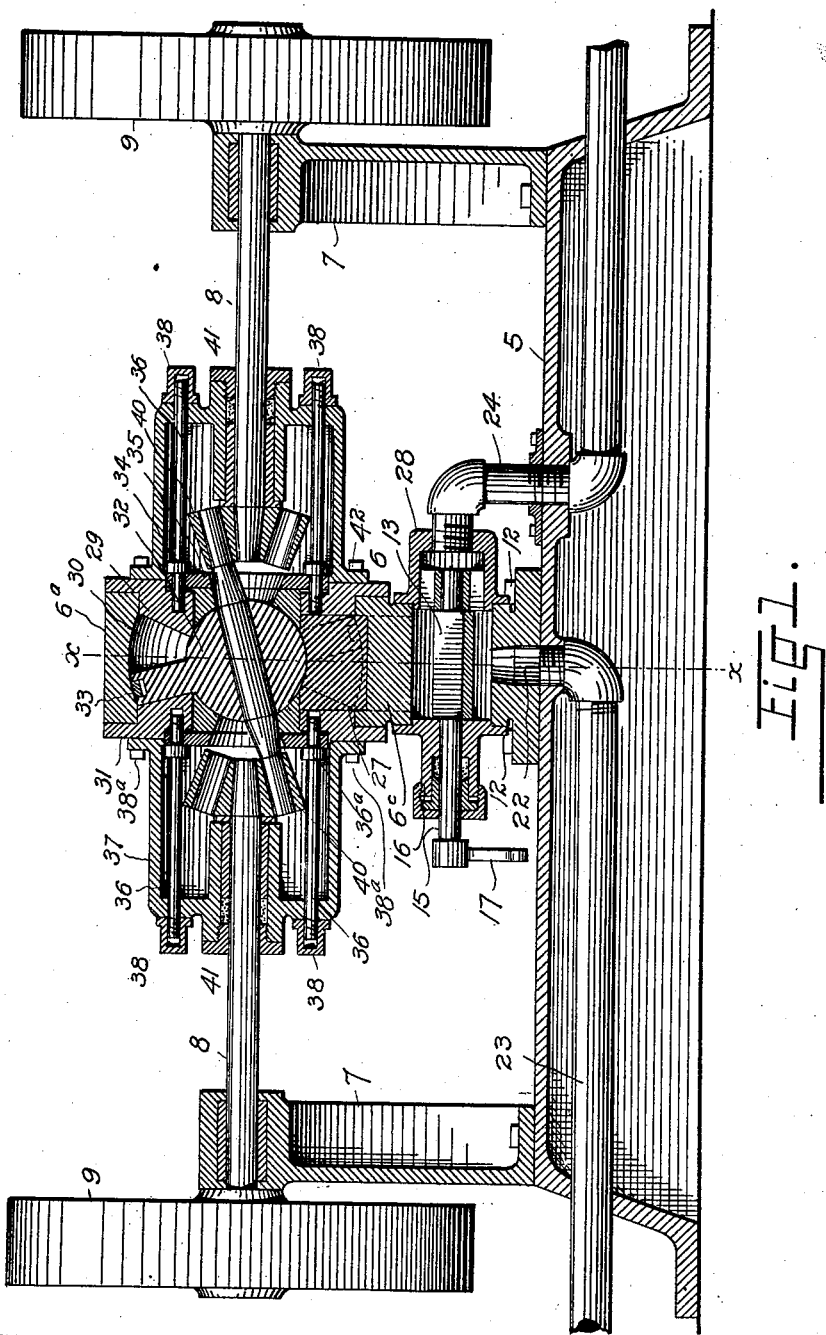

No. 686,686.　　　　　　　　　　　　　　　　Patented Nov. 12, 1901.
H. J. BELL.
ENGINE.
(Application filed Feb. 9, 1900.)

(No Model.)　　　　　　　　　　　　　　　　4 Sheets—Sheet 3.

WITNESSES:
J. H. Bockenfeld
Grace Mytinger.

INVENTOR.
Harold J. Bell
BY
ATTORNEY.

THE NORRIS PETERS CO., PHOTO-LITHO., WASHINGTON, D. C.

No. 686,686. Patented Nov. 12, 1901.
H. J. BELL.
ENGINE.
(Application filed Feb. 9, 1900.)
(No Model.) 4 Sheets—Sheet 4.

WITNESSES:
J. H. Bockenfeld
Grace Mytinger

INVENTOR.
Harold J. Bell
BY
ATTORNEY.

UNITED STATES PATENT OFFICE.

HAROLD J. BELL, OF DENVER, COLORADO, ASSIGNOR TO CHARLES WHEELER AND MARY MONROE BELL, OF DENVER, COLORADO.

ENGINE.

SPECIFICATION forming part of Letters Patent No. 686,686, dated November 12, 1901.

Application filed February 9, 1900. Serial No. 4,674. (No model.)

*To all whom it may concern:*

Be it known that I, HAROLD J. BELL, a citizen of the United States of America, residing at Denver, in the county of Arapahoe and State of Colorado, have invented certain new and useful Improvements in Disk Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in disk engines adapted to be operated by steam, air, or other expansive fluid.

My object is to provide an engine or motor in which the maximum efficiency is attained at a minimum cost of operation and which shall be of simple and compact construction; and to these ends the invention consists of the features, arrangements, and combinations hereinafter described and claimed, all of which will be fully understood by reference to the accompanying drawings, in which is illustrated an embodiment thereof.

Figure 4:
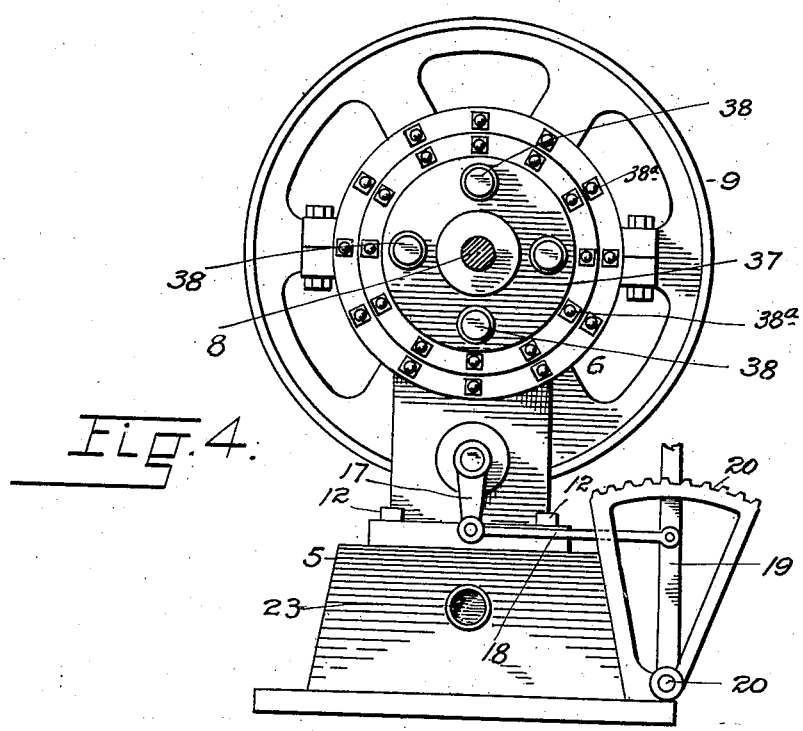
Figure 5:
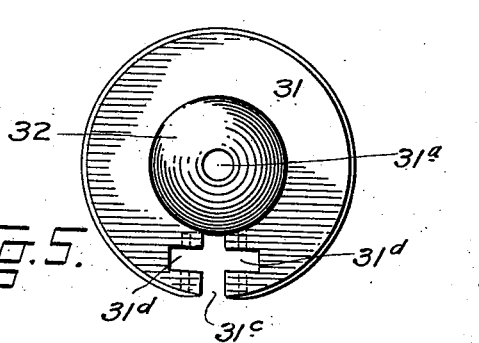
Figure 6:
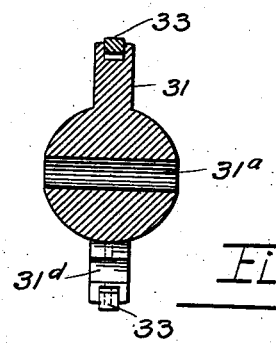
Figure 7:
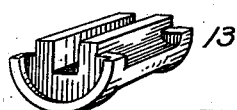
Figure 8:
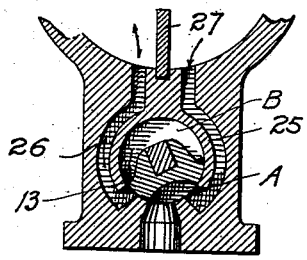
Figure 9:
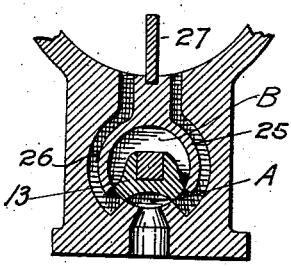
Figure 10:
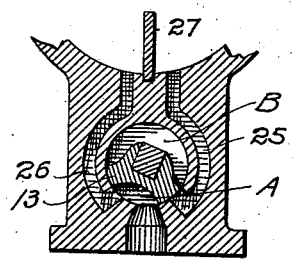
Figures 11, 12, 13:
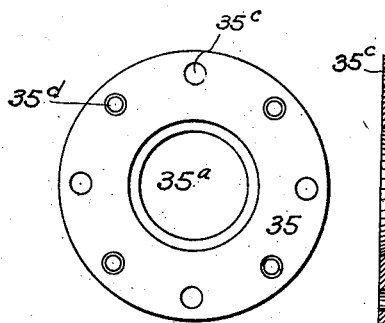
Figure 14:
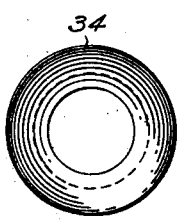
Figure 15:
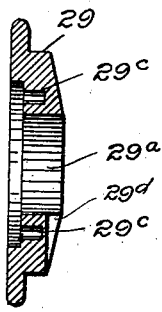
Figure 16:
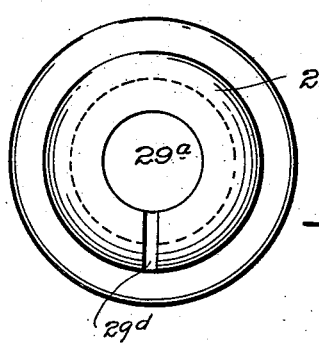

In the drawings, Figure 1 is a vertical longitudinal section taken through my improved engine. Fig. 2 is a cross-section of the same, cutting the disk circumferentially through the peripheral packing-ring. Fig. 3 is a perspective view of the disk, the cranks, and crank-shafts. Fig. 4 is an end elevation of the engine, showing one of the crank-shafts in cross-section. Fig. 5 is a detail view of the disk shown in elevation with its spindle removed. Fig. 6 is a section taken through the same. Fig. 7 is a perspective detail view of the throttle-valve. Figs. 8, 9, and 10 are sectional views taken through the throttle-valve and casing, the valve being shown in three different positions. Figs. 11 and 12 illustrate, in elevation and section, respectively, one of the plates which engage the disk-bearings. Figs. 13 and 14 illustrate a bearing for the disk, shown in elevation and section, respectively. Figs. 15 and 16 illustrate, in section and elevation, respectively, one of the ends or heads of the cylinder, shown in detail. Figs. 17 and 18 show the disk in section and elevation, respectively, another form of bearing for the diaphragm or abutment being illustrated.

The same reference characters designate the same parts in all the views.

The numeral 5 designates a suitable form of base or platform upon which are mounted the cylinder 6 and the uprights 7, forming the bearings for the outer extremities of the crank-shafts 8. Beyond the bearings the shafts are equipped with pulleys 9. As shown in the drawings, the cylinder is composed of two parts $6^a$ and $6^c$, secured together by bolts 10, passed through engaging flanges formed in the respective parts. Formed integral with the lower half of the cylinder is a short vertical column 6, which is secured to the base by bolts 12. This column forms the casing of the throttle-valve 13, located within the chamber 14. The stem 15 of the valve passes through a stuffing-box 16, secured to one side of the casing. This valve-stem protrudes from the stuffing-box, its outer extremity being equipped with a crank-arm 17, which is connected by means of a link 18 with a lever 19, fulcrumed on the base at 20 and located adjacent a toothed segment 21. The extremity of the valve-chamber opposite the valve-stem stuffing-box is provided with a hollow extension-cap 28, communicating with a pipe 24, leading from a source of steam or other fluid employed in the operation of the engine. The bottom of the valve-chamber is provided with a port 22, communicating with an exhaust-pipe 24. Two ducts or passages, respectively designated by the numerals 25 and 26, connect the valve-chamber with the cylinder-chamber. These ducts are adapted to communicate at their lower extremities with the lower part A or the upper part B of the valve-chamber (according as they carry the exhaust or live steam) and at their upper extremities with the bottom of the cylinder on opposite sides of the diaphragm or abutment 27. The fluid may enter the cylinder by way of either of the passages 25 26, or it may be entirely cut off from both, according to the position of the valve 13. When the fluid enters by way of one passage, it exhausts by way of the other passage. The fluid as it leaves the pipe 24 on its way to the cylinder-port enters the space B above the valve and passes thence into the duct 26, if the valve is in the position shown in Fig. 8, or into the duct 25, if the valve is in the position shown in Fig. 10.

The direction of the crank-shafts' rotation is controlled by the movement of the valve. If the fluid enters the cylinder by way of the duct 25, the rotation of said shafts will be in the direction opposite that which occurs when the fluid enters the cylinder by way of the duct 26.

The extremities of both ducts where they enter the cylinder-chamber extend the entire width of said chamber. The cylinder is provided with ends or heads 29, which are secured to the body of the cylinder by bolts 30. (See Fig. 4.) The inner surfaces of the heads 29 are cone-shaped. Within the cylinder-chamber, between the two heads, is located the disk 31, which forms the piston of the cylinder. In a circumferential groove formed in the periphery of the disk is located a spring packing-ring 33, which engages the curved inner surface of the cylinder, forming a steam-tight joint. The central portion of the disk is spherical and engages bearings 34, whose inner surfaces are of counterpart shape, as shown at $34^a$. These disk-bearing parts 34 are surrounded by the cylinder-heads, which are provided with central openings in which the said bearings are located. These bearings are provided with conical openings $34^c$, which register with openings $35^a$, formed in the plates 35, which engage the bearings exteriorly and hold them in place. The plates 35 are in turn held in place by bolts 36, which pass through crank-boxes 37, secured to the cylinder-heads by bolts $38^a$. The outer extremities of the bolts 36 protrude from the crank-boxes and are shaped to receive a wrench for purposes of adjustment. The inner extremities of these bolts pass through openings $35^c$, formed in the plates 35, and finally enter threaded sockets $29^c$, formed in the heads 29. These bolts are provided with collars $36^a$, which engage the plates 35 exteriorly and hold them in place. By turning the bolts in the one direction or the other, according as it is necessary to tighten or loosen the two bearings 34, the latter may be adjusted as desired from the outside. To accomplish this, it is only necessary to remove the screw-caps 38, which normally conceal the external extremities of the bolts. Then by applying a wrench to the bolt ends the aforesaid adjustment may be quickly and easily accomplished.

A spindle 39 passes through a central opening $31^a$, formed in the spherical part of the disk which is fast on the spindle. The extremities of this spindle pass through the conical registering openings $34^c$ and $35^a$, formed in the bearings 34 and the plates 35, respectively. The extremities of the spindle are respectively journaled in cranks 40, made fast to the inner extremities of the two shafts 8, which pass through stuffing-boxes 41 of the crank-boxes 37. The disk 31 occupies an inclined position, forming oblique angles, with a vertical plane passed through the center of the cylinder and cutting its walls circumferentially. The opposite sides of the disk engage the two cylinder-heads 29 on two radial lines located diametrically opposite each other in the cylinder-chamber and referred to in this specification as "contact-lines."

The cylinder-diaphragm 27, located between the two ducts 25 and 26, as aforesaid, bears against the spherical surface of the disk, which it is curved to fit. The disk is slotted at $31^c$ to receive the diaphragm which prevents the rotation of the disk. The disk is provided with antifrictional bearings 43, mounted in recesses $31^d$, formed on opposite sides of slot $31^c$. These bearings engage the diaphragm on opposite sides during the disk's movement.

The disk does not rotate, but has a gyratory movement within the cylinder-chamber, whereby its spindle extremities describe circles and rotate the crank-shafts through the instrumentality of cranks 40, in which the spindle extremities are journaled, as hereinbefore described. By virtue of the position of the disk its spindle extremities respectively engage the two cranks on opposite sides of the shafts 8, which are simultaneously and uniformly rotated by the disk. Each crank 40 is secured to the inner extremity of its crank-shaft 8 and projects equally on opposite sides of the shaft. The crank has two bearing-sockets $40^a$, one being formed in each projection of the crank. When one of these sockets is in use, the other may be filled with Babbitt metal, whereby the crank is balanced when the spindle extremity is in position. When one socket becomes worn, the other may be used by removing the Babbitt metal and inserting the spindle-journal.

Instead of the antifrictional rollers 43 a single roller 44 (see Figs. 17 and 18) may be journaled in the disk and slotted, as shown at $44^a$, to fit over the diaphragm. In the operation of the engine the throttle-valve is turned to admit the steam or other fluid to the cylinder-chamber on the one side or the other of the diaphragm 27, as may be desired. Assuming that the disk is in the position shown in Fig. 1, there is a continuous chamber-compartment on the right-hand side of the disk extending from one side of the diaphragm to the other, said chamber increasing in width from zero at the diaphragm to the top of the cylinder, where it attains its maximum width. On the opposite or left-hand side of the disk two chamber-compartments are formed, the width of each being zero at the top of the chamber, but gradually increasing in width toward the diaphragm, where the maximum width of each is attained. The large chamber on the right of the disk is full of steam, (if this is the fluid employed,) but both the induction and exhaust ports are closed. On the opposite side of the disk, however, the induction-port is open to one of the two chambers, (which are equal in volume,) while the exhaust-port is open to the other chamber. In the large chamber on the right the pressure on the entire surface of the disk is equal, and if the exhaust-port was closed to confine the steam in the one twin chamber on the left while the steam is entering the other twin chamber there could be no movement of the disk, as the pressure on both sides would be equal; but since the one twin chamber is open to permit exhaust the balance or equilibrium of pressure is destroyed and the disk begins to gyrate, "tipping," so to speak, toward or into the exhaust-chamber and causing the radial contact-line between the disk and the conical head 29 on the left to travel downwardly, diminishing the size of the exhaust-chamber and increasing the volume of the live-steam chamber until the radial contact-line reaches the diaphragm, when the exhaust-chamber on the left is reduced in volume to zero and the previously-divided compartment becomes a continuous compartment from one side of the diaphragm around the cylinder to the other side of the diaphragm, the extremities of the said chamber at the diaphragm being zero in width, the chamber attaining its maximum width at the center or top of the cylinder, still referring to Fig. 1, which, it will be remembered, is a section cut through the center of the cylinder from top to bottom. In the meantime the radial contact-line on the right-hand side of the disk travels upwardly from the diaphragm on the inlet-port side of the diaphragm, forming the space on the right-hand side of the disk into two compartments, the smaller being in communication with the live steam from the inlet-port and the larger in communication with the exhaust-port. The size of the live-steam chamber increases until the radial contact-line reaches the top of the cylinder, when the compartments are equal. The disk has now made a one-half gyration and is in a position the reverse of that shown in Fig. 1, the large chamber being on the left of the disk and cut off from the induction and exhaust ports, while the twin chambers are on the right of the disk, both increasing in width from the radial line of contact at the top downwardly to the diaphragm, one of the chambers being open to the live steam and the other communicating with the outlet or exhaust port of the cylinder-chamber. Hence, as before explained, the equilibrium of pressure will be destroyed by the exhaust from the one twin chamber and the gyration of the disk will continue the one radial line of contact—namely, that on the right of the disk—traveling downwardly in the exhaust-chamber, whose volume diminishes until the radial contact-line reaches the diaphragm, when the exhaust-chamber on the right becomes zero in volume, the two twin chambers being merged into a continuous chamber, which is cut off from the two ports. In the meantime the other radial line of contact— namely, that on the left of the disk—travels upwardly from the diaphragm on the steam-inlet side of the latter, dividing the continuous chamber into two unequal chambers, the smaller being on the inlet side and in communication with the live steam, while the larger is in communication with the exhaust-port. As soon as the radial contact-line traveling upwardly on the left side of the disk, as aforesaid, reaches the top of the cylinder the space on the left of the disk is again divided into two chambers equal in volume, one being open to the inlet-port and the other being open to the exhaust-port of the cylinder. The disk has now made one complete gyration, being again in the position shown in Fig. 1, and the operation is repeated as long as the cylinder is supplied with fluid.

In further explanation of the operation of the engine it may be stated (assuming that the disk is in the position shown in Fig. 1) that there are two wedge-shaped chambers of equal volume on the left-hand side of the disk, the bases of the wedges being on the opposite sides of the diaphragm and their apexes meeting at the radial central line at the top of the cylinder and on the left of the disk. As the steam enters at the base of one of these chambers the base of the other is open to the exhaust-port. The steam entering the one chamber crowds itself between the disk and the conical wall of the cylinder-head and moves the disk, causing the apex of the chamber to travel in front of it until the said apex has moved downwardly to the diaphragm, forming a chamber having the shape of two curved wedges whose bases are in contact at the top of the cylinder and whose apexes are located on opposite sides of the diaphragm. In other words, the gyratory movement may be said to be imparted to the disk by a steam-wedge, whose splitting action is constantly separating the disk and cylinder-head on a contact-line which is the apex of the wedge. As the disk gyrates in the manner heretofore explained the extremities of its spindle travel in circles and rotate the crank-shafts. The reverse movement may at any time be imparted to the shafts by shifting the throttle-valve to allow the fluid to enter the cylinder on the opposite side of the diaphragm. When the steam is entering the cylinder by one of the passages 25 26, it exhausts through the other passage, entering the top portion of the valve-chamber and passing thence out of one end of the valve-chamber into the exhaust-conduit 24.

In Fig. 11 of the drawings two sets of openings are shown in the plate 35 and designated as 35$^c$ and 35$^d$, respectively. The openings 35$^c$ are unthreaded to permit the passage of the adjusting-bolts 36. In case it is not desired to use these bolts ordinary bolts may be inserted in the threaded openings 35$^d$ and the plates secured to the heads of the cylinder in this manner.

The cylinder-heads 29 should be grooved, as shown at 29$^d$, to receive the extremities of the diaphragm 27. The function of these grooves is to facilitate the forming of steam-tight joints between the diaphragm and the heads of the cylinder.

Having thus described my invention, what I claim is—

1. The combination of a cylinder provided with concave bearings located in openings formed in the cylinder-heads, plates engaging said bearings exteriorly, adjusting-bolts passed through openings formed in the plates and entering threaded sockets formed in the cylinder-heads, the bolts being provided with collars engaging the plates, a gyratory disk located in the cylinder and engaging the end bearings, a spindle passed through the disk at right angles to the plane of gyration, cranks on which the spindle extremities are journaled, and shafts to which the cranks are made fast.

2. The combination of a cylinder provided with concave bearings located in openings formed in the cylinder-heads, plates engaging said bearings exteriorly, adjusting-bolts passed through openings formed in the plates and entering threaded sockets formed in the cylinder-heads, the bolts being provided with collars engaging the plates, a gyratory disk located in the cylinder and engaging the end bearings, a spindle passed through the disk at right angles to the plane of gyration, cranks on which the spindle extremities are journaled, and shafts to which the cranks are made fast, each crank projecting equally on opposite sides of the shaft and having two spindle-bearings.

3. The combination of a cylinder provided with concave bearings located in openings formed in the cylinder-heads, plates engaging said bearings exteriorly, adjusting-bolts passed through openings formed in the plates and entering threaded sockets formed in the cylinder-heads, the bolts being provided with collars engaging the plates, a gyratory disk located in the cylinder and engaging end bearings, a spindle attached to the center of the disk at right angles to the plane of gyration, a shaft, a crank fast on the shaft, projecting therefrom equally in both directions and provided with two bearings either of which is adapted to receive the spindle extremity.

4. The combination of a cylinder provided with concave bearings located in openings formed in the cylinder-heads, plates engaging said bearings exteriorly, adjusting-bolts passed through openings formed in the plates and entering threaded sockets formed in the cylinder-heads, the bolts being provided with collars engaging the plates, a gyratory disk located in the cylinder and engaging end bearings, a spindle attached to the center of the disk at right angles to the plane of gyration, a shaft, a crank fast on the shaft, projecting therefrom equally in both directions and provided with two bearings either of which is adapted to receive the spindle extremity, the unused bearing-openings being normally filled with a soft metal to balance the crank.

5. The combination of a cylinder, a disk located therein and occupying an inclined position, provision being made to prevent rotation and permitting a gyratory movement of the disk, a spindle passed through the disk at right angles to the plane of gyration, shafts whose axes are in line with the center of circles described by the spindle of the gyratory disk, and cranks in which the spindle extremities are journaled, each crank projecting equally on opposite sides of the shaft and provided with two spindle-sockets, one of which is filled with a removable metal to balance the crank while the other opening is in use.

6. The combination of a cylinder provided with concave bearings located in openings formed in the cylinder-heads, plates engaging said bearings exteriorly, adjusting-bolts passed through openings formed in the plates and entering threaded sockets formed in the cylinder-heads, the bolts being provided with collars engaging the plates, a gyratory disk located in the cylinder and engaging the end bearings, and a spindle passed through the disk at right angles to the plane of gyration.

7. The combination of a cylinder provided with concave end bearings located in openings formed in the cylinder-heads, plates engaging said bearings exteriorly, boxes attached to the cylinder-heads and surrounding said plates, adjusting-bolts passing through the boxes and openings in the plates and entering threaded sockets in the cylinder-heads, the bolts being provided with stop-collars engaging the plates, a gyratory disk located in the cylinder and having a spherical central portion engaging said end bearings, and a spindle passed through the disk at right angles to the plane of gyration, its extremities projecting into the chambers inclosed by said boxes.

8. The combination of a cylinder provided with concave end bearings located in openings formed in the cylinder-heads, plates engaging said heads, boxes attached to the cylinder-heads and surrounding said plates, adjusting-bolts passing through the boxes and openings in the plates and entering threaded sockets in the cylinder-heads, the bolts being provided with collars engaging the plates, a gyratory disk located in the cylinder and having a spherical central portion engaging said end bearing, a spindle passed through the disk at right angles to its plane of gyration, its extremities projecting into the chambers inclosed by the said boxes, shafts journaled in the boxes and provided with cranks in which the spindle extremities are journaled.

In testimony whereof I affix my signature in presence of two witnesses.

HAROLD J. BELL.

Witnesses:
GRACE MYTINGER,
A. J. O'BRIEN.